(12) United States Patent
Maly et al.

(10) Patent No.: US 7,519,865 B1
(45) Date of Patent: Apr. 14, 2009

(54) SYSTEMS AND METHODS FOR IDENTIFYING INCOMPLETE TRANSACTIONS

(75) Inventors: John Warren Maly, Laporte, CO (US); Ryan Clarence Thompson, Loveland, CO (US); Zachary Steven Smith, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1235 days.

(21) Appl. No.: 10/839,859

(22) Filed: May 6, 2004

(51) Int. Cl.
*G06F 11/00* (2006.01)

(52) U.S. Cl. .......................................... 714/33

(58) Field of Classification Search .................. 714/33, 714/37, 39
See application file for complete search history.

(56) References Cited

U.S. PATENT DOCUMENTS

| | | | |
|---|---|---|---|
| 6,772,370 B1 * | 8/2004 | Sun et al. ....................... | 714/33 |
| 2008/0082785 A1 * | 4/2008 | Jourdan et al. ................. | 712/5 |

* cited by examiner

*Primary Examiner*—Bryce P Bonzo

(57) ABSTRACT

In one embodiment, a system and method for identifying incomplete transactions includes identifying termination of a test case run on a processor verification system, examining a pending transaction list to identify incomplete transactions, and examining at least one forward progress vector to identify incomplete transactions.

29 Claims, 9 Drawing Sheets

SYSTEMS AND METHODS FOR IDENTIFYING INCOMPLETE TRANSACTIONS

BACKGROUND

Computer processor design is an extremely complex and lengthy process. The design process includes a range of tasks from high-level tasks such as specifying the architecture down to low-level tasks such as determining the physical placement of transistors on a silicon substrate. Each stage of the design process also involves extensive testing and verification of the design through that stage. One typical stage of processor design is to program the desired architecture for the processor using a register transfer language (RTL). The desired architecture is represented by an RTL specification that describes the behavior of the processor in terms of stepwise register contents. The RTL specification models what the processor does without describing the physical circuit details. Thus, the processor architecture can be verified at a high level with reference to the RTL specification, independent of implementation details such as circuit design and transistor layout. The RTL specification also facilitates later hardware design of the processor.

The testing process is complicated for architectures supporting multiple cache memories. For example, a computer architecture may support multiple processors or processor cores having either a shared memory, multiple dedicated memories, or both, as well as multiple cache memories (referred to hereinafter simply as caches). Multiple memory agents may be provided to handle memory operations or transactions in the system that access the shared memory or other memories and the caches. For example, one of the processor cores may initiate a read transaction to read a line of memory. The line of memory may be stored in one or more locations in the system, such as in the shared memory and in one or more of the caches. The memory agents work together to determine the source from which the line of memory should be read for the processor core.

The memory agents and memories may be connected in a number of ways, such as by a bus or by a point-to-point (P2P) link network using any of a number of suitable protocols. A single memory transaction may be quite complex, involving requests and data being sent back and forth among the multiple memory agents, memories, and caches. The sequence of data transmissions depends upon the type of transaction (read, write, etc.), the locations and states of the line of memory in the system, the bus protocol employed, etc. Therefore, testing the operation of the memory agents in the system can be an extremely complex and data-intensive procedure.

The testing process is further complicated by the need to identify transactions, such as those processed by the memory agents, that are initiated but which do not complete. To cite an example, a given processor or processor core may generate many transactions (e.g., read requests, write requests, etc.), each of which has certain defined finish criteria that indicate when the transaction is completed. If a given transaction does not end, there is a potential a flaw in the processor design. In addition to unending transactions, other transactions may never have an opportunity to complete. For instance, a given read or write request may be denied if there is a conflict (e.g., an address or resource conflict). If a later retry is not successful, the request may go uncompleted.

Unfortunately, the occurrence of such unending or incomplete transactions may not be identified during the verification testing. In such a case, the processor designer may be ignorant of a potential flaw in the processor design, and discovery of the flaw may be delayed until late in the design process, or even after processor fabrication has been completed.

SUMMARY

In one embodiment, a system and method for identifying incomplete transactions includes identifying termination of a test case run on a processor verification system, examining a pending transaction list to identify incomplete transactions, and examining at least one forward progress vector to identify incomplete transactions.

BRIEF DESCRIPTION OF THE DRAWINGS

The disclosed systems and methods can be better understood with reference to the following drawings. The components in the drawings are not necessarily to scale.

DETAILED DESCRIPTION

Figure 1:
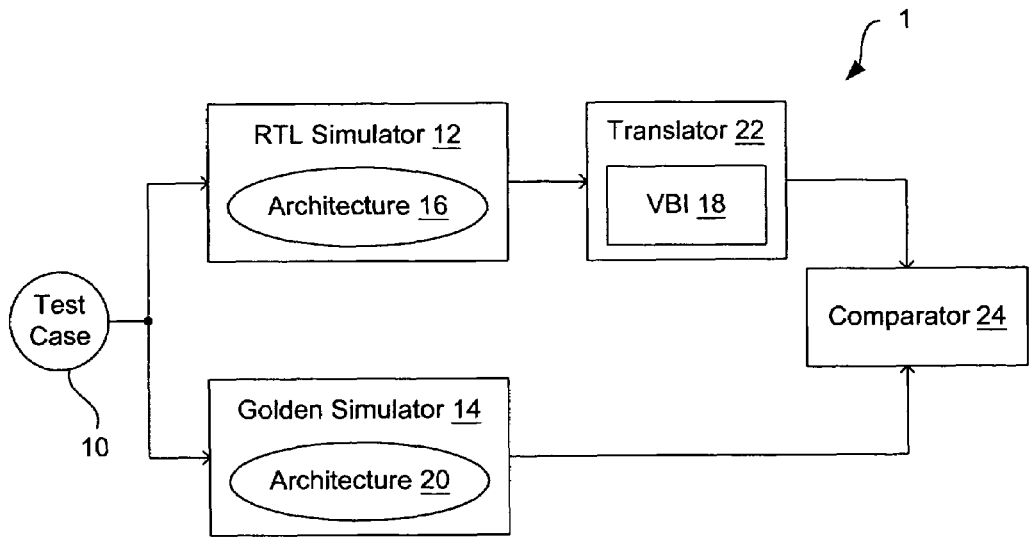
FIG. 1 is a block diagram of an exemplary system for verifying a processor architecture.

Disclosed are systems and methods for identifying incomplete transactions of a simulated processor architecture. Referring to FIG. 1, an example processor architecture verification system 1 is illustrated that verifies processor architecture by executing at least one test case 10 on both a register transfer language (RTL) simulator 12 that comprises a compiled version of the RTL specification, and a golden simulator 14 that comprises a relatively high-level program that emulates operation of the processor. The RTL simulator 12 and the golden simulator 14 both simulate the desired architecture 16 and 20, respectively, of the processor. However, because the output of the RTL simulator 12 and the golden simulator 14 are in different formats, as will be discussed below, a translator 22 translates the output of the RTL simulator to match the format of the golden simulator. Notably, the output of the golden simulator 14 may instead be translated to match the format of the RTL simulator 12.

The translated output of the RTL simulator 12 (translated by the translator 22) is compared with the output of the golden simulator 14 in a comparator 24. If any differences in the outputs are detected by the comparator 24, the processor designer is alerted to the fact that an error may exist in the RTL simulator 12 or the golden simulator 14 or both. This enables test cases to be applied to the processor architecture quickly while minimizing required designer attention.

In the exemplary embodiment described herein, the golden simulator 14 is designed with a front side bus (FSB) output interface, while the RTL simulator 12 is designed with a point-to-point (P2P) link network output interface, as will be described in more detail below. In alternative embodiments, however, the RTL simulator 12 may comprise an FSB output interface. The translator 22 comprises a virtual bus interface (VBI 18) that translates transactions from the RTL simulator 12 from P2P link network format to FSB format for comparison with the FSB format output of the golden simulator 14.

In some cases, the same golden simulator 14 may be used in the design of more than one processor, such as a family of processors all sharing the same underlying architecture. For instance, if the golden simulator 14 is designed with a given output interface in mind and a new processor is designed with a different output interface, the translator 22 enables the same golden simulator 14 to be used with the RTL simulator 12 for the new processor.

In some embodiments, the translator 22 de-pipelines the output of the RTL simulator 12 for comparison with the output of the golden simulator 14. In such an embodiment, the translator 22 may be referred to as a "depiper" for de-pipelining the output of the RTL simulator 12. The output of the RTL simulator 12 is de-pipelined in such an embodiment because the golden simulator 14 is more abstract than the RTL simulator 12. In particular, the golden simulator 14 does not include the same level of detail about the processor architecture being verified as does the RTL simulator 12. For example, the architecture, as simulated by the RTL simulator 12, may be superscalar and highly pipelined, while the golden simulator 14 simulates the architecture without this level of detail. The result is that many, e.g., 20 or 30, instructions may be acting on the RTL simulator 12 simultaneously such that the output of the RTL simulator does not match the output of the golden simulator 14 directly, even though the underlying architecture is the same and the test case is identical.

The RTL simulator 12 and the golden simulator 14 are operated relative to information specified by the test case 10. In one exemplary embodiment, the test case 10 comprises a program to be executed on the processor architecture 16 and 20 in the RTL simulator 12 and golden simulator 14. The test case program is a memory image of one or more computer-executable instructions, along with an indication of the starting point, and may comprise other state specifiers such as initial register contents, external interrupt state, etc. Accordingly, the test case 10 defines an initial state for the processor that is being simulated and the environment in which it operates. The test case 10 may be provided for execution on the RTL simulator 12 and golden simulator 14 in any suitable manner, such as an input stream or an input file specified on a command line.

The RTL specification used to generate the RTL simulator 12 is, for example, implemented using the iHDL hardware description language, from the Intel Corporation of Santa Clara, Calif. Alternatively, the RTL specification may be implemented using any suitable tool for modeling the processor architecture 16, such as any register transfer language description of the architecture, which may be interpreted or compiled to act as a simulation of the processor. The RTL simulator 12 of an exemplary embodiment contains an application program interface (API) that enables external programs, including the translator 22, to access the state of various signals in the simulated processor such as register contents, input/outputs (I/Os), etc. Thus, the output of the RTL simulator 12 may be produced in any of a number of ways, such as an output stream, an output file, or as states that are probed by an external program through the API. The RTL simulator 12 may simulate any desired level of 20 architectural detail, such as a processor core, or a processor core and one or more output interfaces.

As noted above, the golden simulator 14 of the exemplary embodiment is a relatively abstract, higher-level simulation of the processor architecture 20, and therefore may be less likely to include faults or errors than the RTL simulator 12. The golden simulator 14 is written using a high level programming language such as C or C++. Alternatively, the golden simulator 14 may be written using any other suitable programming language, whether compiled, interpreted, or otherwise executed. Whereas the RTL simulator 12 actually matches the details and reality of the processor being simulated to a great degree, the golden simulator 14 is a conceptual model without concern for timing considerations arising from physical constraints.

Figure 2:
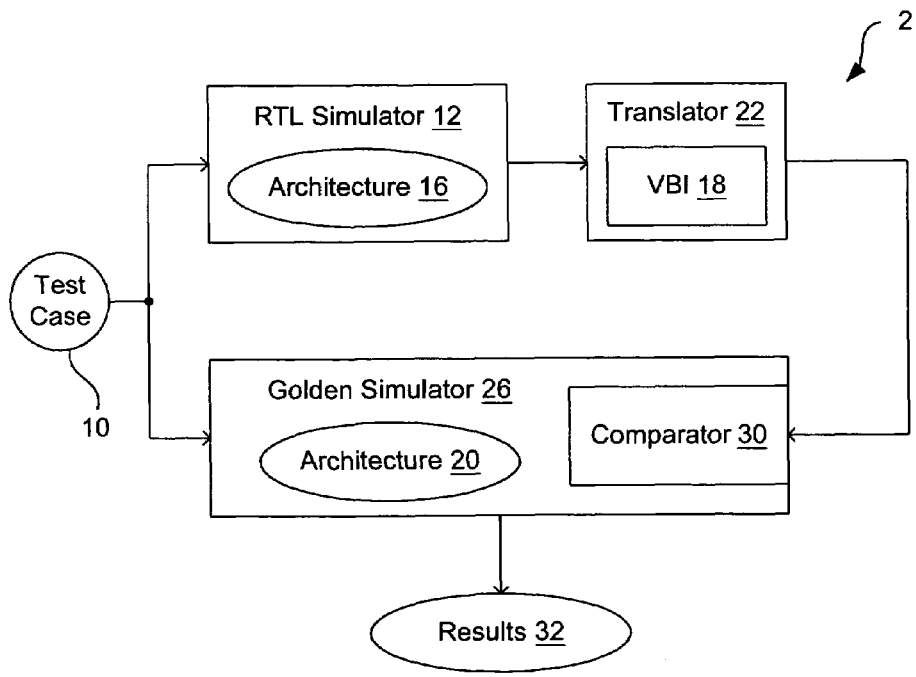
FIG. 2 is a block diagram of an alternative exemplary system for verifying a processor architecture.

The tasks to be performed in the architecture verification system may be divided as desired. For example, in an alternative embodiment illustrated in FIG. 2, a processor architecture verification system 2 includes a golden simulator 26 that contains a comparator 30. In the embodiment of FIG. 2, the test case 10 is executed by the RTL simulator 12 and the golden simulator 26. The results of the RTL simulator 12 are translated by the translator 22, and are fed into the golden simulator 26. The comparator 30 in the golden simulator 26 then compares the results of the golden simulation and the translated results from the RTL simulator 12, and the results 32 are made available by the golden simulator.

The translator design depends on the output formats of the RTL simulator 12 and golden simulator 14 or 26. In one exemplary embodiment, the output of the RTL simulator 12 and golden simulator 14, 26 differs due to pipeline differences in the models as well as due to different output interfaces. The RTL simulator 12 includes architectural details such as the highly-pipelined, superscalar nature of the processor. Thus, a large number of instructions may be acting on the processor at one time. In contrast, the golden simulator 14, 26, although based on the same architecture being verified, is modeled without pipelines as a simple in order machine that processes a single instruction at a time. As described above, the translator 22, in some embodiments, includes a depiper that de-pipelines the data and events in the RTL simulator 12. The output of the RTL simulator 12 is thus simplified to appear as if it were generated by a simple in-order machine, thereby enabling the comparator (e.g., 24 or 30) to compare the translated results of the RTL simulator with the results of the golden simulator 14, 26. An exemplary depiper is described in U.S. Pat. No. 5,404,496, which is incorporated by reference herein for all that it discloses.

When provided, the depiper tracks instructions as they flow through the RTL simulator 12 and notes their effects on the simulated processor. The depiper may generate a retire record for each instruction that indicates when the instruction started executing and when it completed or retired, along with the states that changed during execution. In some cases, if state changes cannot be tracked to a single instruction, the depiper may generate a generic report identifying an altered state and the instructions that may have caused the change. Thus, the output of the RTL simulator 12 is simplified for comparison with the golden simulator 14, 26.

In embodiments in which the translator 22 includes a depiper, the VBI 18 works in parallel with the depiper in the translator, with the depiper producing state change records such as depiper retire records, and the VBI producing state change records in the form of synthesized FSB transactions. Although the VBI 18 may read the P2P packets directly from the P2P interface on the RTL simulator 12 and may access information about the RTL simulated processor via the API, the VBI may also access information about the RTL simulated processor that is stored in the depiper. In some embodiments, the depiper contains structures that monitor the simulated processor core's states. In such cases, it may be convenient for the VBI 18 to access some information from the depiper for use in reporting or synthesizing fields used in the FSB phases.

In other embodiments in which the translator 22 includes a depiper, the depiper first reads the P2P output of the RTL simulator 12 and de-pipelines the P2P transactions, generating a de-pipelined version of the P2P transactions. The VBI 18 then reads the depipelined version of the P2P transactions from the depiper and generates corresponding FSB transactions for the comparator 24 or 30. The de-pipelined P2P transactions may be transferred from the depiper to the VBI 18 in any suitable manner, such as across a virtual P2P link or in a file containing depiper retire records.

The VBI 18 is not limited to use with verification systems including a depiper. Verification systems having the same level of pipelining detail in both the RTL simulator 12 and the golden simulator 14, 26 may not need a depiper, but a VBI 18 still enables processor simulators with different output interfaces to be used together. If the translator 22 includes a depiper, the VBI 18 may access information stored in the depiper as described above, or may be implemented as a module in the depiper for convenience. In embodiments in which the translator 22 does not include a depiper, the VBI 18 in the translator 22 still directly connects to the P2P output of the RTL simulator 12, but obtains other information about the state of the simulated processor from the RTL simulator via the API. The VBI 18 uses the resulting P2P packets and other information to produce translated FSB transactions in whatever manner required by the comparator 24, 30, such as generating a virtual FSB connection to the comparator, or generating output reports containing records of FSB format transactions that may be read by the comparator.

Figure 3:
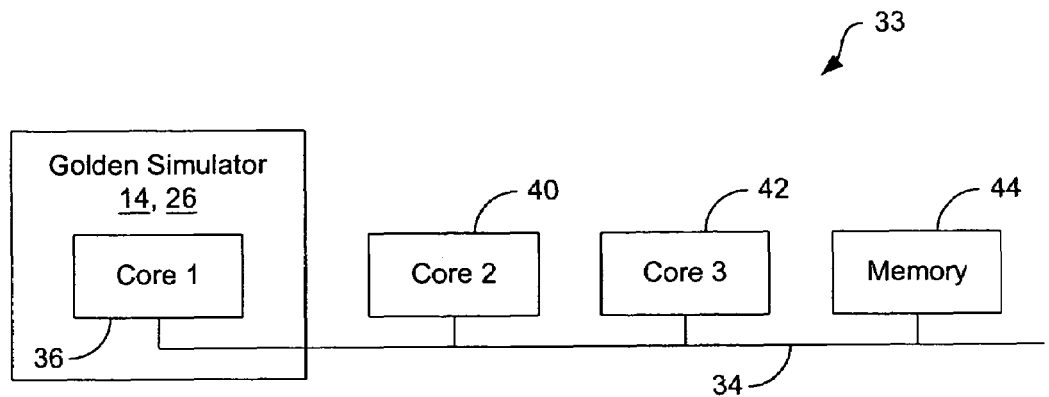
FIG. 3 is a block diagram of an exemplary system of computer components or agents connected by a front side bus.

Exemplary output interfaces of the RTL simulator 12 and the golden simulator 14, 26 will now be described in more detail. FIG. 3 illustrates an example output interface 33 for the golden simulator 14, 26. As is shown in that figure, the example golden simulator 14, 26 uses a front side bus 34 (FSB). In the embodiment of FIG. 3, a simulated processor core 36, Core 1, based on the desired architecture 20 and simulated in the golden simulator 14, 26, is connected to the FSB 34 and therefore to external components or agents such as other simulated processor Cores 2 and 3 (40 and 42), a memory 44, etc. Those external agents 40, 42, and 44 may comprise actual physical devices. For example, the memory 44 may be a portion of the memory of the computer executing the golden simulator 14, 26. Alternatively, one or more of the external agents 40, 42, and 44 may be simulated components that are either simulated by the golden simulator 14, 26 or by an external simulator. Alternatively, one or more of the external agents 40, 42, and 44 may be virtual components represented by pre-programmed responses in the test case 10 that are issued by the golden simulator 14, 26 in response to transactions from the simulated Core 1 (36).

The FSB 34 is a broadcast bus in which bus traffic is visible to each agent connected to the FSB and each agent monitors the traffic to determine whether the traffic is addressed to them. An exemplary operation or "transaction" performed by Core 1 (36), such as a memory read operation, may comprise multiple phases. For example, consider an exemplary read operation performed by the Core 1 (36) using the FSB 34 to read data from the memory 44. The exemplary transaction comprises an arbitration phase, a request A, a request B, a snoop phase, and a data phase. Each of these five phases is performed by transmitting or receiving a block of information over the FSB 34. The comparator 24 or 30 expects to see a report for each of the five phases that acts as a state input to be compared against inputs generated by the golden simulator 14, 26. The different phases are defined in the FSB output format and place the system into various states. For example, during the snoop phase, the transaction becomes globally visible so that the transaction is visible to each core 36, 40, and 42, thereby facilitating a shared memory architecture.

Figure 4:
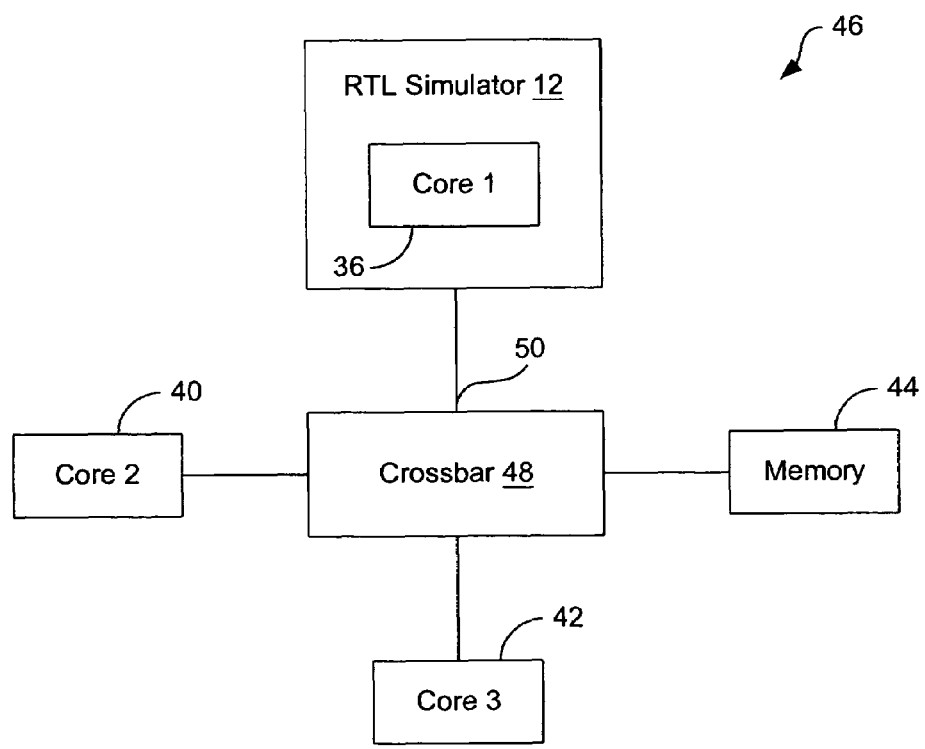
FIG. 4 is a block diagram of an exemplary system of computer components or agents connected by a point-to-point link network.

In contrast, the RTL simulator 12 of the exemplary embodiment may use one or more ports into a point-to-point (P2P) link network 46 shown in FIG. 4. With reference to FIG. 4, the P2P link network 46 is a switch-based network with one or more crossbars 48 acting as switches between agents such as processor cores 36, 40, and 42, memory 44, or other devices. Transactions are directed to specific agents and are appropriately routed in the P2P link network 46 by the crossbar 48. This operation of the crossbar 48 reduces the load on the system agents because they do not need to examine each broadcast block of information as with the FSB 34. Instead, each agent ideally receives only data meant for that agent. Use of the crossbar 48 also avoids bus loading issues that can plague FSB systems. Therefore the P2P link network 46 facilitates better scalability. Transactions on the P2P link network 46 are packet-based, with each packet containing a header with routing and other information. Packets containing requests, responses, and data are multiplexed so that portions of various transactions may be executed with many others at the same time. Transmissions are length limited, with each length-limited block of data called a "flit." Thus, a long packet will be broken into several flits, and transactions will typically require multiple packets. Therefore, the P2P link network 46 is monitored over time to collect the appropriate P2P packets until enough information exists for a corresponding FSB phase to be generated by the translator 22.

The translator VBI 18 translates entire transactions by reading the P2P packets and generating corresponding FSB phases for the transaction so that the transactions can be compared by the comparator 24, 30 with transactions from the golden simulator 14, 26. The translator 22 may be designed to only monitor packets passing in and out of the simulated Core 1 (36), and/or may monitor other packets in the P2P link network 46 if desired. In the exemplary embodiment illustrated in FIG. 4, the translator 22 monitors the port 50 on the crossbar 48 that is connected to the simulated Core 1 (36) in the RTL simulator 12.

Figure 5:
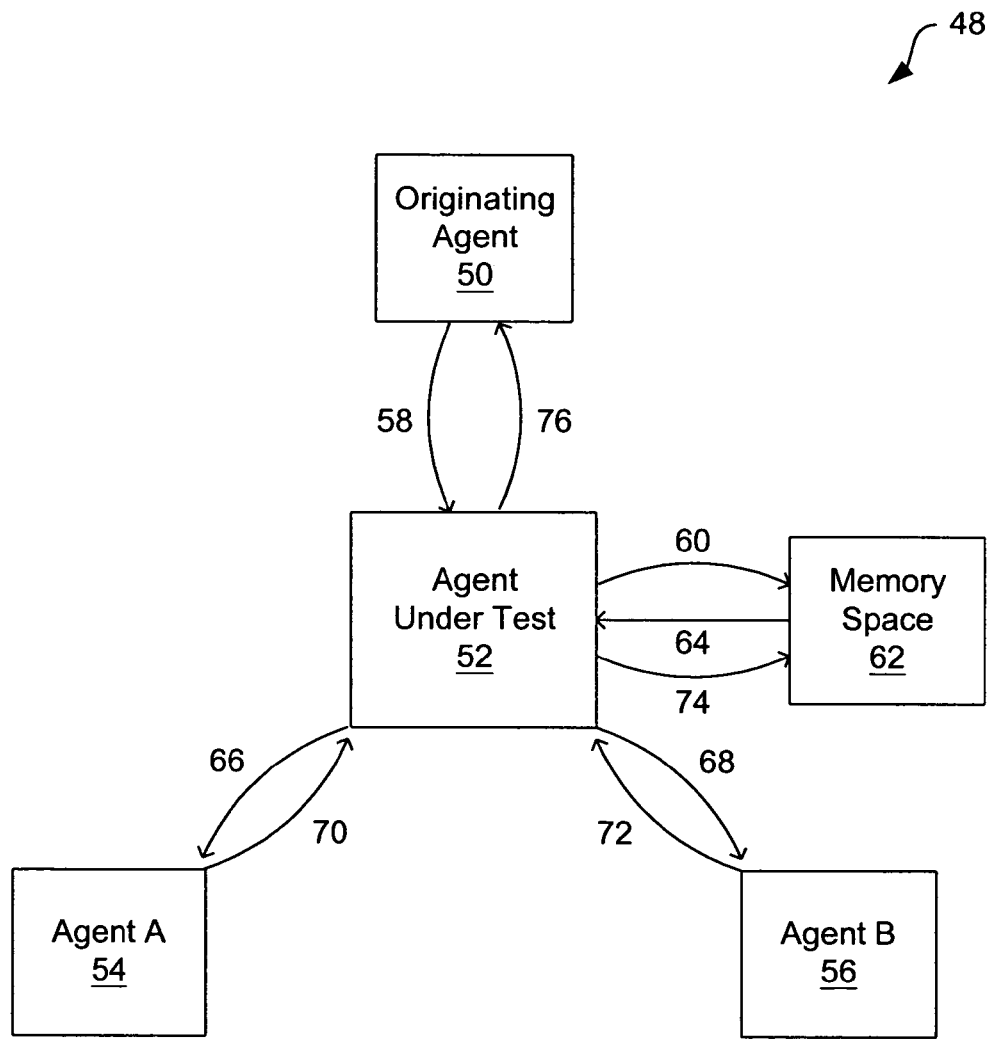
FIG. 5 is a block diagram illustrating exemplary logical data flow in a point-to-point link network comprising several memory agents.

FIG. 5 illustrates an example of transactions traversing a system that includes a network 48. As is shown in the figure, the network 48 comprises several agents that generate and/or process the transactions. As used in this disclosure, the term "agent" refers to any component of a system that receives incoming signals or transactions and generates outgoing signals or events as a result, wherein expected values or states of the outgoing signals may be determined based on the incoming transactions, possibly in connection with other information, before the actual outgoing signals are generated by the agent. In example of FIG. 5, the agents comprise memory agents.

A testing tool, or "checker," can be provided to monitor the input and output (I/O) of an agent and to generate and use transaction records and expectation records. Such a checker may be used to test agents during architectural verification at any stage, including in a software simulation of an architecture and a test of actual hardware. The checker does this by identifying transactions and creating expectations relative to those transactions. In that process, transaction records and expectation records are generated and stored in any data structure suitable. By way of example, transaction records are stored in a transaction list vector, such as a container template defined in the C++ Standard Template Library (STL), which resembles a C++ array in that it holds zero or more objects of the same type. The vector container is defined as a template class, meaning that it can be customized to hold objects of any type. Each of these objects may be accessed individually, using an iterator to step through the vector. The transaction list vector is dynamically expandable by adding new transaction records to the end of the vector. Each transaction record contains an expectation list vector for storing expectation records associated with that transaction record.

When a new transaction is detected at the input of the agent, a transaction record is created and is added to the transaction list vector. When an event expectation is generated, that is, when enough information is available to determine that an event should be generated by the agent, an expectation record is added to the expectation list vector for the appropriate transaction record. For example, if the agent receives a request to read a line of memory in a region belonging to that agent, the checker may expect to see a read request sent from the agent to a cache connected to the agent. In this example, a transaction record would be established for the memory read transaction, and an expectation record would be added to the expectation list vector in that transaction record, indicating that a read request should be sent from the agent to that cache. Similarly, if the cache returns the desired line of memory to the agent in a response, the checker adds another expectation record to the expectation list vector in that transaction record, indicating that the data in the response should be forwarded on by the agent to the originator of the transaction.

The term "stimulus" is used herein to refer generally to any input to an agent under test for which an output from the agent under test may be expected by the checker, that is, for which an expectation may be generated by the checker. This includes, for example, an initial request to perform a memory operation, the responses to snoops by the agent under test, and the responses to reads from a memory space local to the agent under test. The term "event" is used herein to refer to any output from the agent under test, which generally should be triggered by a stimulus. Thus, the stimulus is the input to the agent under test which triggers an outgoing event.

When an event takes place, that is, when the checker detects an outgoing event from the agent, the transaction is identified, and the checker searches the transaction list vector to find the appropriate transaction record. The transaction may be identified in any suitable manner. In many instances, the event may contain a transaction identification (ID). In other instances, if the event does not contain a transaction ID, the checker identifies the transaction using other information in the system such as an indication of what transaction is current, or an indication in the event of what line of memory is being sought. For example, if the transaction ID is not directly available from an outgoing event, the checker may use a C++STL map to look up transaction ID's from information contained in the outgoing event or elsewhere.

If no transaction record is found for the outgoing event in the transaction list vector, the checker signals an error, indicating that an event has occurred without having been triggered by a stimulus.

If the transaction record is found in the transaction list vector, the expectation list vector is traversed, looking for an expectation record matching this event. If none is found, the checker signals an error, indicating that an unexpected event has occurred. If a match is found, the match may be logged and the expectation record may be deleted from the expectation list vector.

If the event transmitted data, such as the requested line of memory, the data may be compared with a source value that is stored at the time of event creation. In the case of a data transmission expectation that spans multiple units, the event expectation is not deleted until the last unit of data in the expected data transmission is transmitted and compared.

Referring now to the example of FIG. 5, a group of agents 50, 52, 54, and 56 are provided within the network 48. The agents 50, 52, 54, and 56 may be interconnected by a bus (not shown) or other type of interface. The checker (i.e., memory agent checker) described in the foregoing may be used to test an agent connected to other devices in a system by any bus, interface, or protocol or by any combination of buses, interfaces, or protocols in which an agent receives stimuli and transmits events based on these stimuli. In the exemplary embodiment, the agents 50, 52, 54, and 56 are interconnected by a point-to-point (P2P) link network.

During an exemplary memory operation, an originating agent 50 sends data, in this case a transaction 58 requesting a line of memory, to an agent under test 52. The originating agent 50 may comprise, for example, a processor or processor core that is attempting to read a line of memory such as an instruction to be executed. The agent under test 52 queries any other components in the system that may have a copy of the line of memory in order to obtain the most recent version for the originating agent 50. In this exemplary operation, the agent under test 52 transmits a message 60 to a connected memory space 62, such as a cache, requesting the line of memory. In return, the memory space 62 provides a line of memory 64 to the agent under test 52, where the line of memory is temporarily stored. The agent under test 52 concurrently sends snoops 66 and 68 to the other agents 54 and 56, i.e., agent A and agent B in this example. The snoops 66 and 68 request the line of memory from the agents A and B. By way of example, agent A replies with an "Invalid" message 70, indicating that the line of memory is not stored in agent A or its associated memory space (not shown). Assuming, for this example, that the line of memory was stored in modified form in the memory space (not shown) associated with agent B, agent B obtains the modified copy of the line of memory, either from its internal cache or in its associated memory space (not shown), and transmits the modified line of memory 72 to the agent under test 52. The agent under test 52 receives the modified line of memory 72 and overwrites its internal copy of the line of memory with the received modified line of memory. The agent under test 52 then sends a copy 74 of the modified line of memory to its memory space 62 for storage, and sends another copy 76 of the modified line of memory to the originating agent 50.

Other messages (not shown) may be sent throughout the system during the memory operation, both related and unrelated to the memory operation, such as a completion message from the originating agent 50 to the agent under test 52. Note that the sequence of transactions and events described for this memory operation are purely exemplary. The actual transactions and events involved in a memory operation are dependent on the configuration of the system, the types of interfaces between devices in the system, the type of memory operation, etc.

In this exemplary operation, the agent under test 52 receives two incoming stimuli for which expectations may be generated. First, the original request 58 may result in three expectations being generated, expecting the read 60 and snoops 66 and 68 being transmitted to the memory space 62 and agents A and B. (Note that the generation of these three expectations depends on the checker having some information about the configuration of the system. In an alternative embodiment, the checker may not have this information, and would therefore not generate these expectations.) Second, the response 72 from agent B containing the modified line of memory 72 may result in two expectations being generated, expecting the modified line of memory being transmitted 74 and 76 to the memory space 62 and the originating agent 50. Note that the "Invalid" response 70 from agent A in this exemplary embodiment does not result in an event from the agent under test 52. Similarly, the response 64 from the memory space 62 containing the unmodified line of memory 64 does not result in an event from the agent under test 52 because the response 72 from agent B containing the modified line of memory 72 eliminates the need for the unmodified line of memory 64. Again, this exemplary embodiment relies on the checker having information about the configuration of the system, and keeping track of the state of the transaction in the system. In alternative embodiments, the checker may have different levels of information and may generate different expectations accordingly. For example, in one alternative embodiment, the checker may not keep track of the state of the transaction in the system. In this embodiment, the checker would generate an expectation based on the response 64 containing the unmodified line of memory. This expectation would generate an error when no event resulted, and the operator of the test would need to interpret the test results to determine that this was proper and could be ignored.

The checker tests only the agent under test 52, and does not anticipate responses from other devices. Therefore, the line of memory 64 from the memory space 62, the "Invalid" response 70 from agent A, and the modified line of memory 72 from agent B are not expected and are treated as incoming stimuli for which new expectations may be generated if appropriate. In other words, the checker is not waiting for these responses because it is not designed to detect failures in any component of the system but the agent under test 52. Each of these responses from other components may or may not result in expected events, as discussed above. For example, the "Invalid" response 70 from agent A would not result in an outgoing event from the agent under test 52 unless no copy of the line of memory was available from any source in the system, in which case the agent under test 52 might send an "Invalid" message to the originating agent 50. Note that this "Invalid" message from the agent under test 52 might be expected as an event because of either the "Invalid" response 70 from agent A or the original request 58 from the originating agent 50. The checker may be adapted in cases like these to generate expectations from either or both, as desired.

For the present discussion, only two stimuli, the original request 58 from the originating agent 50 to the agent under test 52 and the modified line of memory 72 from agent B, will be considered.

In the first stimulus, when the checker detects the original request 58 from the originating agent 50 at an input to the agent under test 52, the checker determines whether the transaction is new, and if so, adds a transaction record to the transaction list vector. The checker attempts to determine what events should be generated by the agent under test 52 as a result of the stimulus, based upon information in the stimulus and optionally from other information in the system. For example, the checker detects that the stimulus is a request for a line of memory and that three sources should be checked for the line of memory, including the memory space 62 and the other two agents A and B (54 and 56). Therefore, three expectation records are generated and added to the transaction record for the current transaction—a first read message 60 to the memory space 62, and snoops 66 and 68 to agent A and agent B, respectively. As the checker detects each event 60, 66, and 68 at the output of the agent under test 52, the checker identifies the transaction ID for each event from the event or other sources and searches the transaction list vector for the transaction record. The checker then searches the expectation list vector in the transaction record for the expectation record corresponding to the outgoing event. Information in the event is checked or verified as appropriate, such as the address of the line of memory sought. As each outgoing event is detected by the checker and the expectation record is located, the event is verified against the expectation record, and the expectation record is deleted if all was successful, or errors are signaled as discussed above.

Once a transaction is complete, the transaction record may also be deleted. However, note that the completion of all expected events does not necessarily indicate that the transaction is complete. Expectations for some events may not be discernable when the first stimulus of a transaction arrives at the agent. In other words, generation of expectations may continue at any time after the transaction begins until the transaction is officially complete, such as when the originating agent 50 indicates to the agent under test 52 that the transaction is complete.

The second stimulus to be considered is the reception of the modified line of memory 72 from agent B by the agent under test 52. In this stimulus, the checker may determine that the agent under test 52 is expected to transmit the modified line of memory to its associated memory space 62 and to the originating agent. The expectation records generated for these events may contain the modified line of memory, so that when the events are detected at the output of the agent under test 52, the checker may verify that the modified line of memory was correctly transmitted. As discussed above, if the modified line of memory is transmitted in multiple units, such as multiple flits or packets, the checker may collect all units and verify them before deleting the expectation record. In an alternative embodiment, the checker may generate multiple expectation records, one for each expected unit, rather than one for each event.

Note that expectations may be formulated based solely on the information contained in the transaction, or may be formulated based on other information in the system or in other transactions. For example, the checker may need information from the original request 58 as well as from the response 72 containing the modified line of memory 64 to determine that the agent under test 52 should transmit the modified line of memory to the originating agent 50, depending upon what information is contained in the response 72 containing the modified line of memory 64.

As noted above, it may be difficult to identify transactions that do not complete or end in a verification system such as that described in the foregoing. Such incomplete transactions may not be detected in P2P interfaces, such as that used in the RTL simulator 12, due to the configuration and operation of such interfaces. For instance, assume each core of a simulated processor sends many transaction requests to the interface crossbar. If a given transaction is initiated by one of the cores and no other transaction is initiated having the same transaction ID, the failure of the transaction to complete may never be detected. Unfortunately, the golden simulator 14, 26 is unlikely to identify such an incomplete transaction given its relatively high-level nature. Therefore, the processor designer may not be alerted to the fact that the transaction did not end and, therefore, that there may be a flaw in the processor design. As is discussed in the following, incomplete transactions can be detected, however, if an appropriate checker is configured to monitor the time it takes for transactions to complete, and time out transactions that do not so complete. In such a case, the incomplete transactions can be flagged and later evaluated by the processor designer. As is described in the following, such checking functionality can be integrated into the memory agent checker discussed in relation to FIG. 5.

Figure 6A:
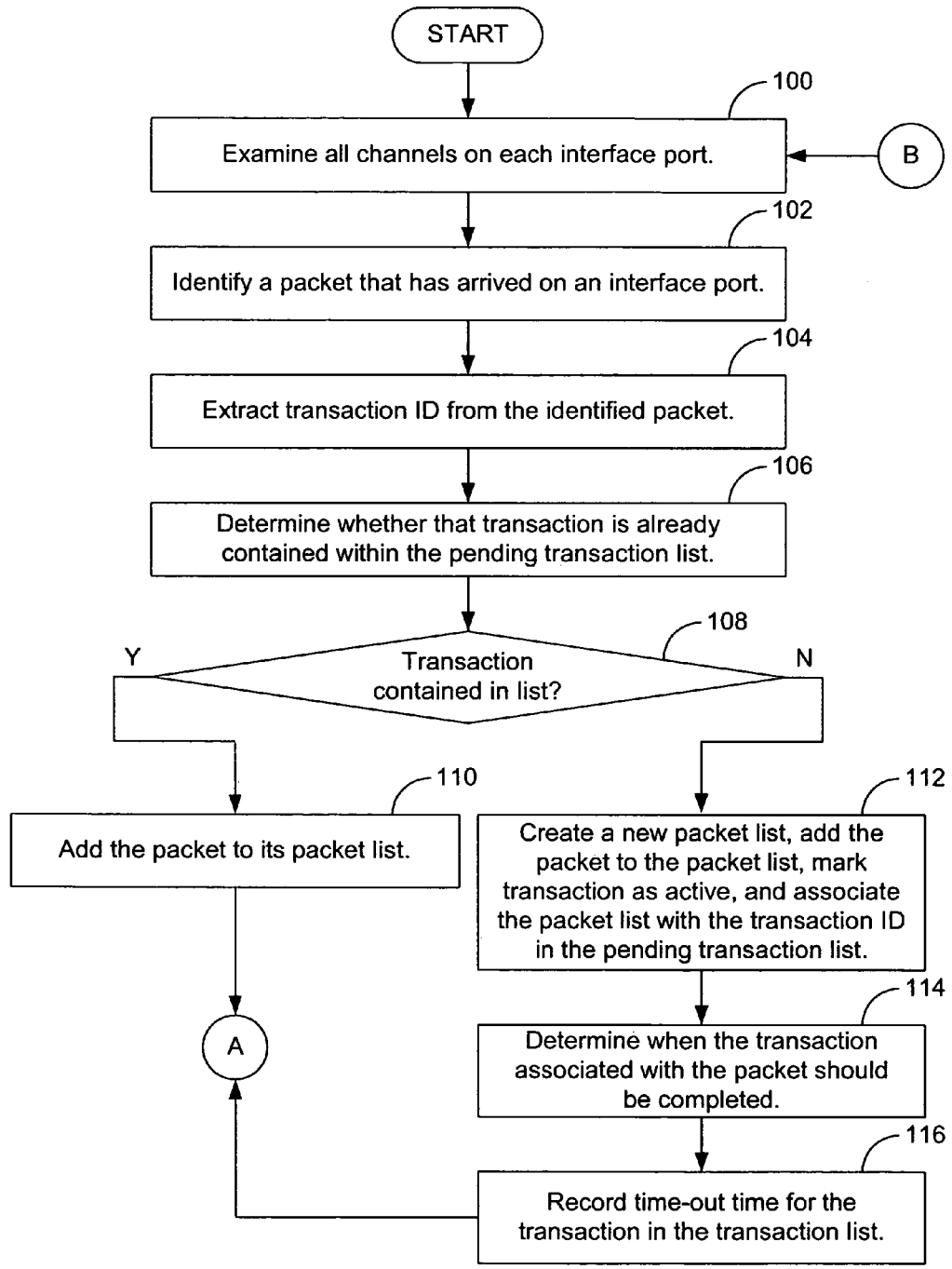
FIGS. 6A and 6B provide an example of operation of a checker in identifying unending transactions.
Figure 6B:
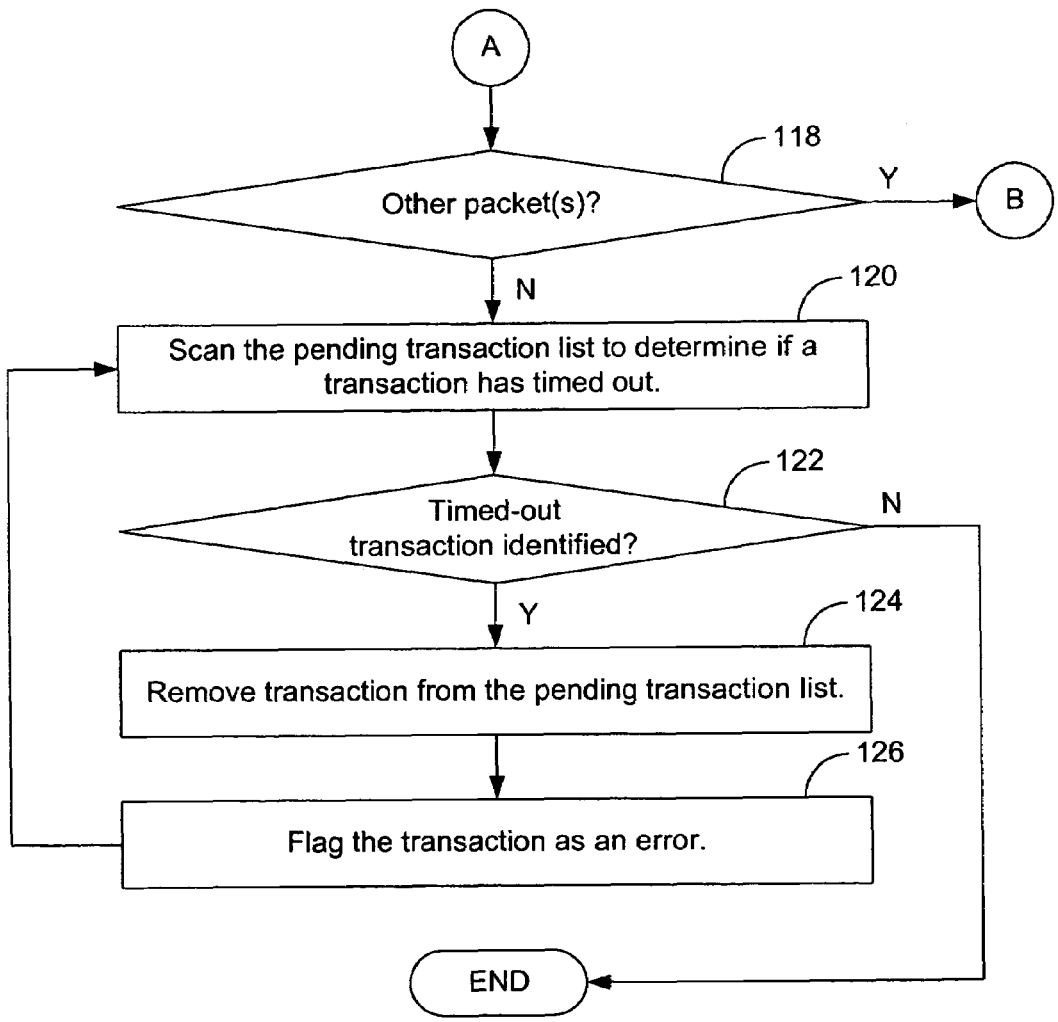

FIGS. 6A and 6B describe an example method for identifying incomplete transactions in a P2P interface. More particularly, FIGS. 6A and 6B describe an example of operation of the memory agent checker in monitoring transactions generated in a P2P link network of the RTL simulator 12 (e.g., network 46, FIG. 4) and flagging transactions that do not complete. By way of example, the flow described in relation to FIGS. 6A and 6B occurs each clock tick.

Beginning with block 100 of FIG. 6A, the memory agent checker monitors the P2P interface (link network) to examine all channels on each interface port so as to identify packets that are issued by any P2P agent (e.g., core). Such examination is possible by the memory agent checker in that, because the checker monitors each channel of the P2P interface, the checker can "see" all traffic that is transmitted over the interface. Through the examination, the memory agent checker can identify a packet that has arrived on an interface port, as indicated in block 102. Once having identified such a packet, the memory agent checker extracts a transaction ID from the packet, as indicated in block 104. The transaction ID can be, for example, contained in the packet header and is assigned by the agent that initiated the transaction. The transaction ID identifies the packet as pertaining to a given transaction and all packets that so pertain to that transaction will comprise the same transaction ID.

Referring next to block 106, the memory agent checker determines whether the transaction identified by the transaction ID is contained within a pending transaction list (e.g., the transaction list vector) that is maintained by the memory agent checker. The determination may comprise, for example, performing a lookup operation within the pending transaction list using the transaction ID as a key. With reference next to decision block 108, if the transaction is contained in the pending transaction list, a packet associated with that transaction has previously been identified and, therefore, a time-out time has already been created for that transaction. In such a case, the memory agent checker adds the packet to the packet list for the transaction, as indicated in block 110. Flow from this point continues to block 118 of FIG. 6B described below.

With reference back to decision block 108, if the packet does not identify a transaction that is already contained in the pending transaction list, the packet is the first packet of a new transaction. In that case, flow continues to block 112 at which the memory agent checker creates a new packet list to which the packet is added, marks the associated transaction as active in the active transaction list, and the associates the new packet list with the transaction ID in the pending transaction list. Through such operation, the packet list can be accessed from the pending transaction list using the transaction ID as a key.

At this point, the memory agent checker establishes rules for deciding whether a given transaction is improperly not completing or ending. In particular, the memory agent checker first determines when the transaction should be completed, as indicated in block 114. That determination may comprise, for example, noting the arrival time of the packet on the P2P interface and the transaction type (e.g., read, write, interrupt, etc.), and using that information as inputs into a time-out function that calculates an estimated time that the transaction should take to complete. Such a time-out function may comprise part of the memory agent checker, or may comprise a separate function that is accessible to the checker. Regardless, the function may take system parameters, such as a particular attribute of the simulated processor, into account in calculating the estimated time. The estimated time is measured in terms of interface or core clock ticks, depending upon the implementation. Although use of such a function has been described, an appropriate lookup table could alternatively be used to provide the same functionality, i.e., to provide an estimated completion time in relation to particular inputs.

Once the completion time has been determined, the memory agent checker next records a time-out time in the pending transaction list for that transaction, as indicated in block 116, to generate a reference against which to check when pending transactions are reviewed to determine whether they have timed out (see, e.g., block 124 of FIG. 6B).

Referring next to decision block 118 of FIG. 6B, flow then depends upon whether there are one or more other packets to process. If so, flow returns to block 100 of FIG. 6A and the various interface channels are again examined to identify the packet(s). If there are no other packets to process, however, the initial packet processing for the present clock tick has been completed and flow continues to block 120 at which the memory agent checker scans the pending transaction list to determine if a transaction has timed out. The time-out determination can be made with reference to finish criteria defined for the particular transaction by the P2P interface. By way of example, the finish criteria for a given transaction may comprise arrival of a certain packet, receipt of a certain number of responses from other cores of the interface, etc. With reference to decision block 122, the memory agent checker then determines whether the transaction at issue has already timed out. In other words, the memory agent checker determines whether the time-out time determined in block 114 and recorded in block 116 has been exceeded by referring to the present clock tick. If no transaction has timed out, no unending transactions have been detected and flow for the present clock tick is terminated. If, on the other hand, a transaction has timed out, it is presumed that the transaction has failed to complete, potentially due to a flaw in the processor design. In such a case, flow continues to block 124 of FIG. 6B at which the memory agent checker removes the transaction from the pending transaction list. At this point, the memory agent checker flags the transaction as an error, as indicated in block 126. Such flagging may comprise, for example, failing the case so as to place the transaction in a category of cases that the processor designer must debug. In addition, such flagging may comprise generating debug information that provides details of the incomplete transaction including, for instance, the identity of the particular transaction, the time the failure to complete was determined, the action that was missing for the transaction to complete, etc. Furthermore, flagging may comprise presenting (e.g., printing) all of the relevant information contained in the packet header including, for example, the identity of the agent that initiated the transaction, the transaction type, the packet address, the packet destination, etc.

After the incomplete transaction has been flagged, flow returns to block 120 at which the memory agent checker again scans the pending transaction list to see if there are one or more other transactions to check. If so, flow continues in the same manner as described above in relation to blocks 122-126 and all incomplete transactions are flagged.

The operation described above alerts the processor designer to the failure to complete and, therefore, to a potential flaw in the processor design. In addition, removal of the incomplete transaction from the pending transaction list enables the memory agent checker to continue processing transactions that occur beyond the point at which the transaction timed out, in particular those with the same transaction ID.

As noted above, transactions also may not complete due to conflicts that arise. For example, a read or write request may be denied due to an address conflict, i.e., when another agent has requested to read from or write to that same address and the later-requesting agent is denied access given that the data stored at that address may be unresolved. To cite another example, an agent request may be denied if a memory agent that manages requests on the interface is occupied satisfying the requests of other agents (i.e., a resource conflict). In such cases, the agent whose request was denied typically re-submits its request at a later time. Such an attempt is commonly referred to as a retry. Ideally, the request will be satisfied (i.e., the retry will be successful) and the desired transaction will complete. It is possible, however, for the transaction to not complete prior to the end of the test case. For instance, multiple retry requests can be denied if the retry timing is such that other conflicts cause the retries to likewise be denied. Regardless of the cause, failure of the transaction to complete hampers forward progress and may result in deadlock.

Figure 7:
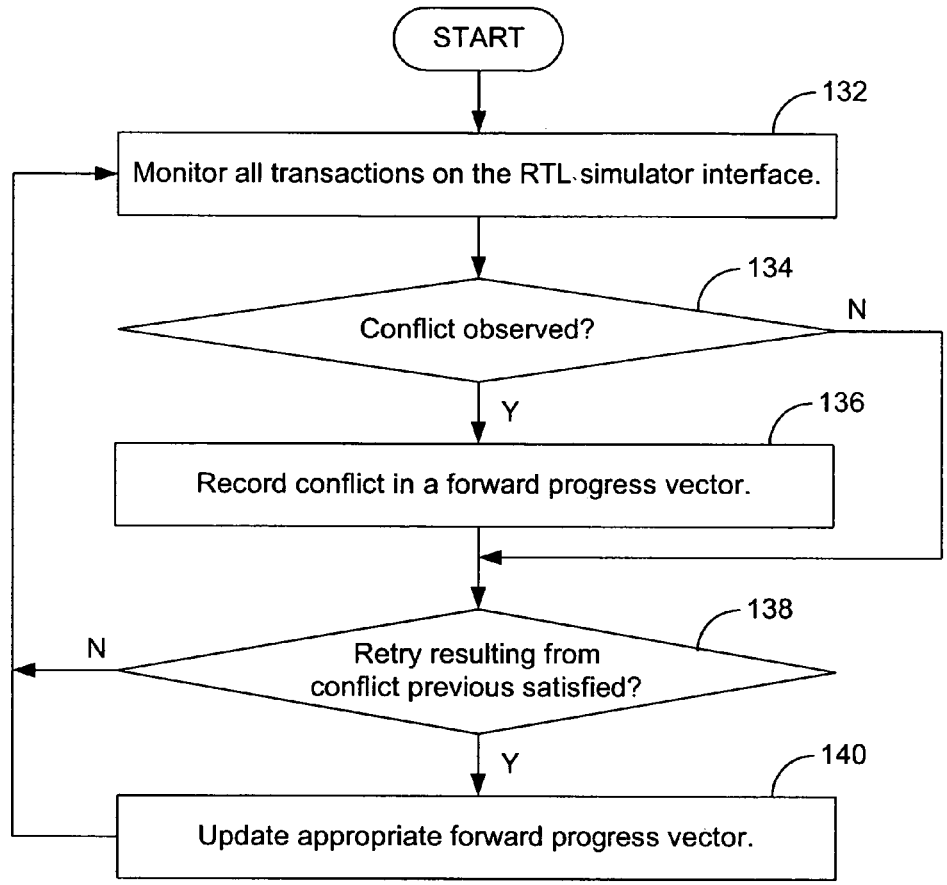
FIG. 7 is a flow diagram of an exemplary operation for tracking transactions that have not been completed due to a conflict.

Although certain incomplete transactions can be identified using the methodology described in relation to FIGS. 6A and 6B, that methodology is not effective in identifying transactions that do not complete because the forward progress problem described above. Accordingly, other measures are necessary to identify incomplete transactions that result from contention such as that described in the foregoing. In one solution, a component of the verification system can be configured to maintain forward progress vectors that track the denial of agent requests so as to create a record that may be used to identify further incomplete transactions. By way of example, the forward progress vectors are associated with a simple memory agent such as the memory agent under test 52 shown in FIG. 5. FIG. 7 describes an example of operation of a simple memory agent in tracking transactions that have not completed due to contention (e.g., address or resource conflict).

Beginning with block 132, the simple memory agent (SMA) monitors all transactions on the RTL simulator interface. In an arrangement such as that illustrated in FIG. 5, the SMA will receive all communications that are emitted on the interface. As requests are made of the SMA (e.g., read or write requests), the SMA populates a transaction table with information about the requests including, for example, the address that is implicated, the agent (e.g., processor core or processor) that made the request, and the like. Due to the SMA's tracking of the requests it receives, the SMA can determine when conflicts arise. For example, if the SMA receives a request to write to a given memory address 0xA, the SMA consults its transaction table to determine whether there is a transaction already pending that implicates that memory address. If so, an address conflict has arisen and the agent making the later request is denied access to the memory address. To cite another example, if the SMA receives a new request but is busy satisfying other requests (e.g., its transaction table is currently full), the SMA may deny the new request as creating a resource conflict.

Figure 8:
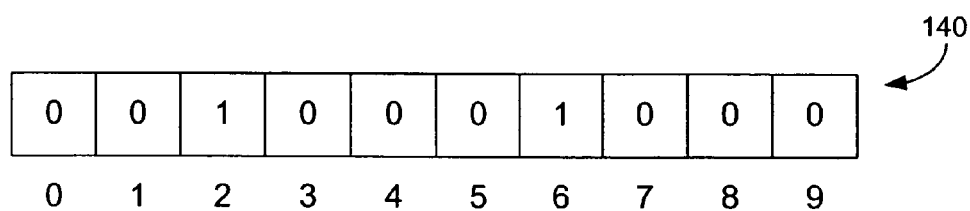
FIG. 8 is a schematic representation of an address pending vector that may be used to track incomplete transactions.

With reference to decision block 134, if a conflict is observed by the SMA, irrespective of its particular nature, the SMA records the conflict in a forward progress vector, as indicated in block 136. A schematic representation of such a vector is shown in FIG. 8. More particularly, illustrated is an address pending vector 142. As is depicted in that figure, the vector 142 comprises a plurality of bits, one bit for each available entry of the SMA transaction table (in this example, the table is assumed to comprise ten such available entries). Initially, each bit of the vector 142 is set to "0," indicating that there is no conflict associated with an unresolved transaction identified in the table. When a conflict arises, however, a "1" is placed in the bit that pertains to the table entry in which a previous, unresolved transaction is recorded. In the example of FIG. 8, two address conflicts have been noted, one pertaining to a transaction recorded in entry "2" of the transaction table, and the other pertaining to a transaction recorded in entry 6 of the table. Notably, a resource pending vector, of similar structure to the vector 140 of FIG. 8, may be used to track resource conflicts as they arise. In such an arrangement, the address pending vector tracks transaction progress relative to memory addresses and the resource pending vector tracks transaction progress relative to the requesting agents. Accordingly, each transaction can be tracked in terms of what address is requested and by which agent.

Once the conflict has been recorded in the appropriate forward progress vector, or if no new conflict had been observed (decision block 134), flow continues to decision block 138 at which the SMA determines whether a retry resulting from a previous conflict has been satisfied and the transaction associated with that retry has been completed. If so, the conflict has been resolved and the appropriate forward progress vector is updated, as indicated in block 140. Such updating, in this example, comprises changing a "1" in one of the forward progress vectors back to a "0." Once such updating is completed, or if no updating was necessary in the first place (decision block 138), flow returns to block 132 at which monitoring of the RTL simulator interface continues.

Certain transactions that are pending when a test model is terminated may be unending or incomplete transactions that should have completed but failed to do so due to an error, for example in the processor design. Such erroneous transactions may not be detected in some interfaces, including P2P interfaces that may be used in the RTL simulator 12. Unfortunately, the golden simulator 14, 26 is unlikely to identify such erroneous transactions given its relatively high-level nature. Therefore, the processor designer may not be alerted to the fact that a given transaction did not complete and, therefore, that there may be a flaw in the processor design. As is described below, however, such incomplete transactions can be detected at the end of the test case by an appropriate checker, such as the memory agent checker.

Figure 9A:
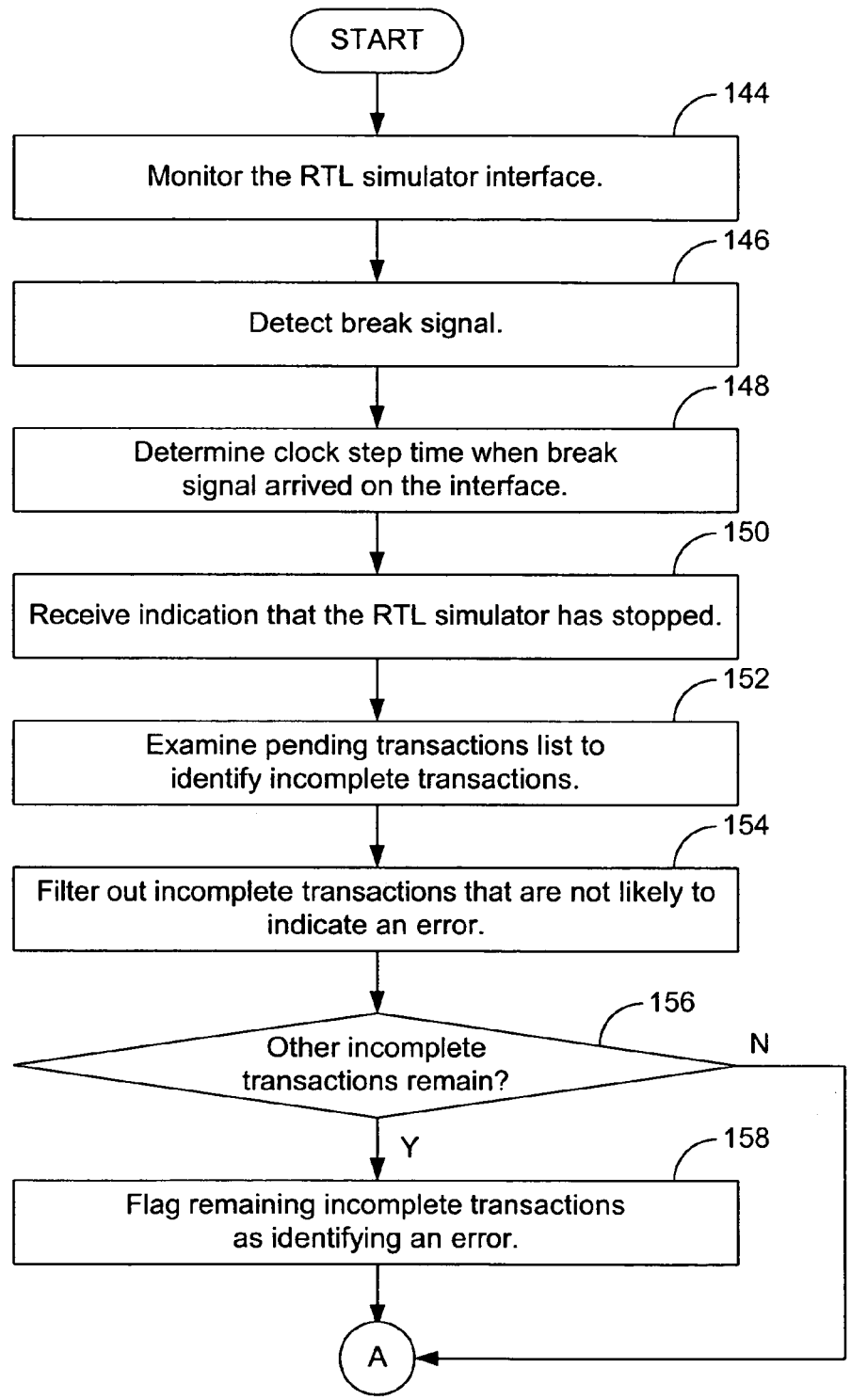
FIGS. 9A and 9B provide an example of operation of a checker in identifying incomplete transactions at the end of a test case.
Figure 9B:
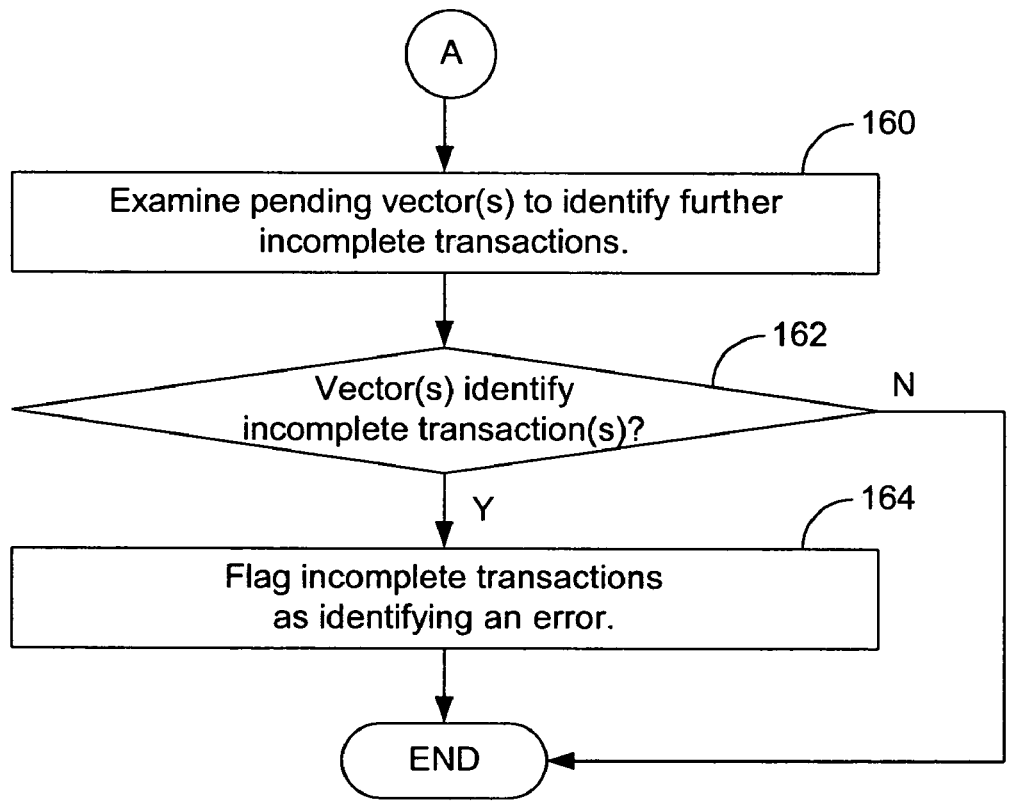

FIGS. 9A and 9B provide an example of operation of the memory agent checker in identifying transactions that are pending after termination of the test case is asserted. More particularly, FIGS. 9A and 9B provide an example of the memory agent checker in identifying incomplete transactions that are pending on an RTL simulator interface. Beginning with block 144 of FIG. 9A, the memory agent checker monitors the RTL simulator interface. In particular, the memory agent checker examines all channels on each interface port of the interface (e.g., P2P interface) so as to identify all traffic that is transmitted over the interface. Therefore, as indicated in block 146, the memory agent checker can detect a break signal. By way of example, such a signal can be asserted by the translator depiper after the depiper detects a break command having been issued by observing a case-ending sequence being executed. Once having detected that signal, the memory agent checker determines the clock step time when the break signal arrived on the interface, as indicated in block 148.

Processing typically does not immediately cease upon issuance of the break command. Instead, one or more code sequences may be executed to implement the cessation analogous to a computer shut-down sequence. Once such code sequence(s) has/have been executed, the memory agent checker receives an indication that the test model has stopped processing, as indicated in block 150. By way of example, that indication can also be provided to the memory agent checker by the translator depiper.

At this point, the memory agent checker identifies all pending transactions that are contained in the pending transaction list (see discussion of FIGS. 6A and 6B), as indicated in block 152. One or more of those pending transactions may be legitimate. Therefore, as indicated in block 154, the memory agent checker filters out pending transactions that appear to be legitimate, i.e., are not likely to indicate an error, prior to making any determinations as to erroneous transactions. An example of transactions that are not likely to indicate an error include transactions that were initiated at the time the break was asserted or thereafter in that such transactions would not be expected to terminate in such a short period of time (i.e. number of clock ticks). Also unlikely to indicate an error are, for example, code fetches, port read line code (PRLC) operations, port read line code with self-snoop (PRLCSS) operations, and the like in that such transactions may pertain to the code sequence(s) that is/are executed after issuance of the break command. Accordingly, the memory agent checker may filter the transactions contained in the pending transaction list by disregarding (i) transactions having a start time on or after the clock step time determined in block 104 (i.e. the time at which the break signal arrived on the interface), (ii) all code fetches, and (iii) any other transaction that, due to the configuration and/or operation of the test model (e.g., RTL simulator 12), may legitimately not have completed after issuance of the break command.

With reference to block 156, the memory agent checker next determines whether other incomplete transactions remain after the filtering described above has been completed. If not, flow continues to block 160 of FIG. 9B described below. If there are other transactions remaining, however those transactions may be considered to be suspect in that, at least in theory, all transactions other than those filtered out by the memory agent checker should have completed by the time the break command was issued or by the time processing ceased. Accordingly, with reference to block 158, the memory agent checker flags all remaining pending transactions as erroneous. Notably, the existence of an erroneous transaction may indicate an error in the processor design (and the RTL specification), the memory agent checker, or a tool used to simulate a system component (e.g., a memory or a core). Alternatively or in addition, such an erroneous transaction may simply indicate that the transaction is otherwise spurious.

Irrespective of the cause of the erroneous transaction, flagging the transaction alerts the processor designer (or other user) as to the potential problem, as well as provides the user with information that can be used to determine the reason for the erroneous transaction(s). Therefore, the flagging of the erroneous transaction may comprise one or more of providing (e.g., printing out) all completed packets associated with the transaction, and/or providing (e.g., printing out) a summary of the entire transaction which describes all processing associated with that transaction (e.g., arrival of packets, contents of packets, etc.). From the provided information, the processor designer may be able to identify what conditions and/or system agents caused the transaction to not complete and, potentially, how to remedy the problem.

With reference next to block 160 of FIG. 9B, the memory agent checker examines the forward progress vectors (see discussion of FIGS. 7 and 8) to determine if there are other incomplete transactions. Specifically, the memory agent checker examines the address pending vector and the resource pending vector to identify transactions that did not complete due to an address or resource conflict. Given that the system agents are configured to retry denied requests, the implicated transactions also should have completed by the time the break command was issued or by the time processing ceased, and an indication of an incomplete transaction signals an error. Referring to decision block 162, if one or both of the forward progress vectors identify one or more an incomplete transaction, flow continues to block 164 and the memory agent checker flags those incomplete transactions as identifying errors. The error flagging may be conducted in similar manner to that described above for incomplete transactions identified from the pending transaction list. At this point, flow for the incomplete transaction identification session is terminated.

In view of the above, a checker (e.g., the memory agent checker) can check for incomplete transactions at the end of a test case by consulting two separate sources: the pending transaction list and the forward progress vectors. By consulting both sources, a more complete evaluation of the verification system behavior, and ability to complete transactions in particular, can be obtained.

Figure 10:
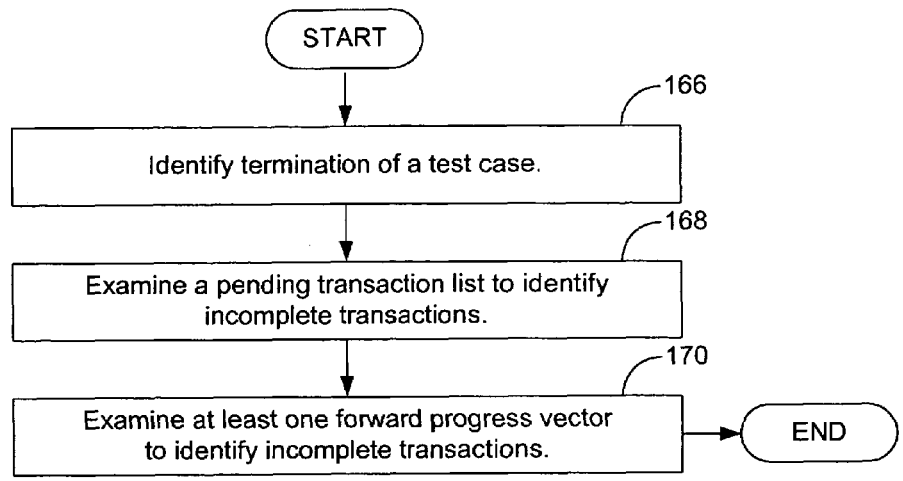
FIG. 10 is a flow diagram of an example method for identifying an unending transaction.

FIG. 10 is a flow diagram of an example method for identifying an unending transaction. As is indicated in that figure, the method comprises identifying termination of a test case (block 166), examining a pending transaction list to identify incomplete transactions (block 168), and examining at least one forward progress vector to identify incomplete transactions (block 170).

Figure 11:
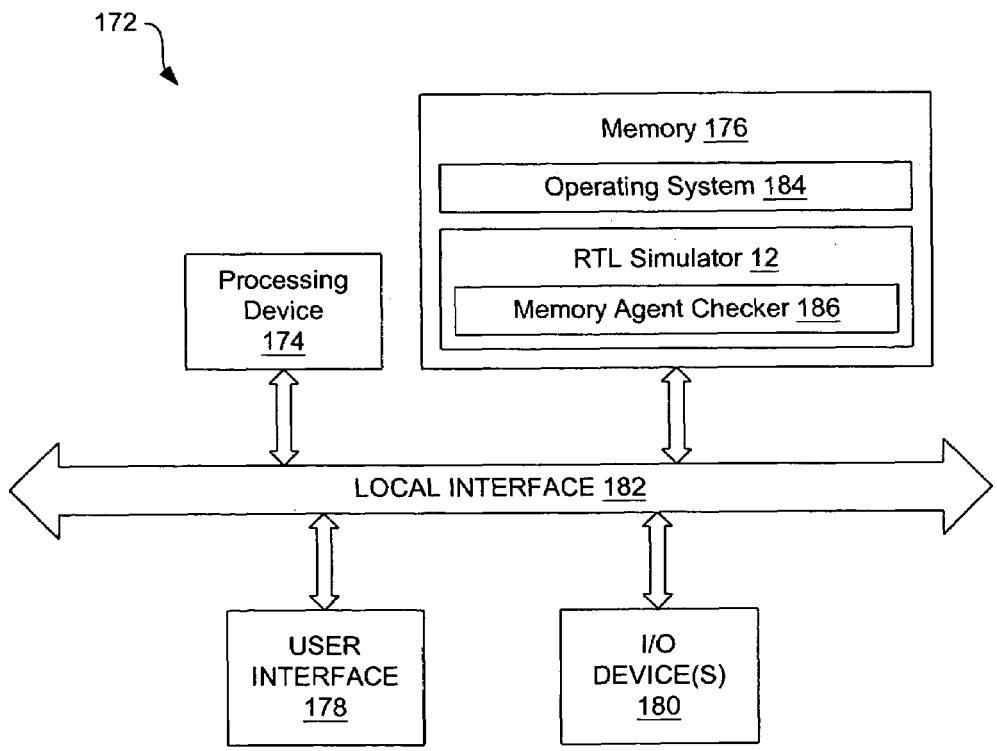
FIG. 11 is a block diagram of an example computer system on which incomplete transactions can be identified.

FIG. 11 is a block diagram of a computer system 172 in which the foregoing systems can execute and, therefore, a method for identifying incomplete transactions can be practiced. As indicated in FIG. 11, the computer system 172 includes a processing device 174, memory 176, at least one user interface device 178, and at least one input/output (I/O) device 180, each of which is connected to a local interface 182.

The processing device 174 can include a central processing unit (CPU) or an auxiliary processor among several processors associated with the computer system 172, or a semiconductor-based microprocessor (in the form of a microchip). The memory 176 includes any one or a combination of volatile memory elements (e.g., RAM) and nonvolatile memory elements (e.g., read only memory (ROM), hard disk, etc.).

The user interface device(s) 178 comprise the physical components with which a user interacts with the computer system 172, such as a keyboard and mouse. The one or more I/O devices 180 are adapted to facilitate communication with other devices. By way of example, the I/O devices 180 include one or more of a universal serial bus (USB), a Firewire, or a small computer system interface (SCSI) connection component and/or network communication components such as a modem or a network card.

The memory 176 comprises various programs including an operating system 184 that controls the execution of other programs and provides scheduling, input-output control, file and data management, memory management, and communication control and related services. In addition to the operating system 184, the memory 176 comprises the RTL simulator 12 identified in FIG. 1. As is shown in FIG. 11, the RTL simulator 12 includes the memory agent checker 186, which has been described in detail above.

Various programs (i.e., logic) have been described herein. Those programs can be stored on any computer-readable medium for use by or in connection with any computer-related system or method. In the context of this document, a computer-readable medium is an electronic, magnetic, optical, or other physical device or means that contains or stores a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

We claim:

1. A method for identifying incomplete transactions in a processor verification system, the method comprising:
    identifying termination of a test case run on the verification system;
    examining a pending transaction list to identify incomplete transactions; and
    examining at least one forward progress vector to identify incomplete transactions.

2. The method of claim 1, wherein identifying termination of a test case comprises monitoring a register transfer language simulator interface.

3. The method of claim 1, wherein identifying termination of a test case comprises monitoring a point-to-point interface.

4. The method of claim 1, wherein identifying termination of a test case comprises detecting a break signal asserted on an interface.

5. The method of claim 1, wherein examining a pending transaction list comprises determining a clock step time when a break signal arrived on an interface.

6. The method of claim 5, wherein examining a pending transaction list further comprises filtering out transactions identified in the pending transaction list that are not likely to indicate an error.

7. The method of claim 6, wherein filtering out transactions comprises disregarding at least one of transactions having a start time on or after the time at which a break signal was asserted and transactions that occur as a result of a break command being issued.

8. The method of claim 1, wherein examining at least one forward progress vector comprises examining at least one of an address pending vector that identifies address conflicts and a resource pending vector that identifies resource conflicts.

9. The method of claim 1, further comprising reporting an error if an incomplete transaction is discovered.

10. The method of claim 9, wherein reporting an error comprises alerting a user as to the existence of the incomplete transaction and providing information that can be used to determine the reason why the transaction did not complete.

11. A system for identifying incomplete transactions in a processor verification system, the system comprising:
    means for monitoring an interface to identify termination of a test case run;
    means for examining a pending transaction list that identifies transactions that are pending; and
    means for examining at least one forward progress vector that identifies transaction conflicts.

12. The system of claim 11, wherein the means for monitoring comprise means for monitoring a point-to-point interface of a register transfer language simulator.

13. The system of claim 12, wherein the means for monitoring comprise means for detecting a break signal asserted on the interface.

14. The system of claim 11, wherein the means for examining a pending transaction list comprise means for filtering out transactions identified in the pending transaction list that are not likely to indicate an error.

15. The system of claim 14, wherein the means for filtering out transactions comprise means for determining a clock step time when a break signal arrived on an interface.

16. The system of claim 15, wherein the means for filtering out transactions further comprise means for disregarding at least one of transactions having a start time on or after the time at which the break signal was asserted and transactions that occur as a result of a break command being issued.

17. The system of claim 11, wherein the means for examining at least one forward progress vector comprise means for examining at least one of an address pending vector that identifies address conflicts and a resource pending vector that identifies resource conflicts.

18. The system of claim 11, further comprising means for reporting errors for discovered incomplete transactions.

19. A system stored on a computer-readable medium, the system comprising:
    logic configured to monitor an interface of a register transfer language simulator;
    logic configured to examine a pending transaction list after termination of a test case run on the register transfer system simulator, the pending transaction list identifying transactions that were pending when the test case ended;
    logic configured to examine forward progress vectors that identify address and resource conflicts that were unresolved when the test case ended; and
    logic configured to identify transactions that are incomplete.

20. The system of claim 19, wherein the logic configured to monitor an interface is configured to detect a break signal asserted on the interface.

21. The system of claim 20, wherein the logic configured to monitor an interface is configured to determine a clock step time when the break signal arrived on the interface.

22. The system of claim 19, wherein the logic configured to identify transactions that are incomplete is configured to filter out transactions having a start time on or after the time at which a break signal was asserted and transactions that occur as a result of a break command being issued.

23. The system of claim 19, wherein the logic configured to examine forward progress vectors is configured to examine at least one of an address pending vector and a resource pending vector.

24. The system of claim 19, wherein the logic configured to report an error is configured to alert a user as to the existence of the incomplete transaction and provide information that can be used to determine the reason why the transaction did not complete.

25. A computer system, comprising:
    a processor; and
    memory including a memory agent checker, the memory agent checker being configured to monitor an interface of a register transfer language simulator, the memory agent checker further being configure to, at the end of a test case run on the register transfer language simulator, examine a pending transaction list that identifies pending transactions, examine forward progress vectors that identify address and resource conflicts that were unresolved when the test case ended, and make a determination as to which of any observed incomplete transactions indicate a potential error.

26. The system of claim 25, wherein the memory agent checker is further configured to detect a break signal asserted on the interface and determine a clock step time when the break signal arrived on an interface.

27. The system of claim 25, wherein the memory agent checker is further configured to filter out transactions having a start time on or after the time at which a break signal was asserted and transactions that occur as a result of a break command being issued.

28. The system of claim 25, wherein the memory agent checker is configured to examine forward progress vectors is configured to examine at least one of an address pending vector and a resource pending vector.

29. The system of claim 25, wherein the memory agent checker is further configured to report the existence of the incomplete transaction and provide information that can be used to determine the reason why the transaction did not complete.

* * * * *